May 12, 1931. J. M. RAMSEY 1,805,185
COMBINED SUPPORT AND SHUTTER ACTUATING MEANS FOR CAMERAS
Filed Oct. 14, 1929 2 Sheets-Sheet 1
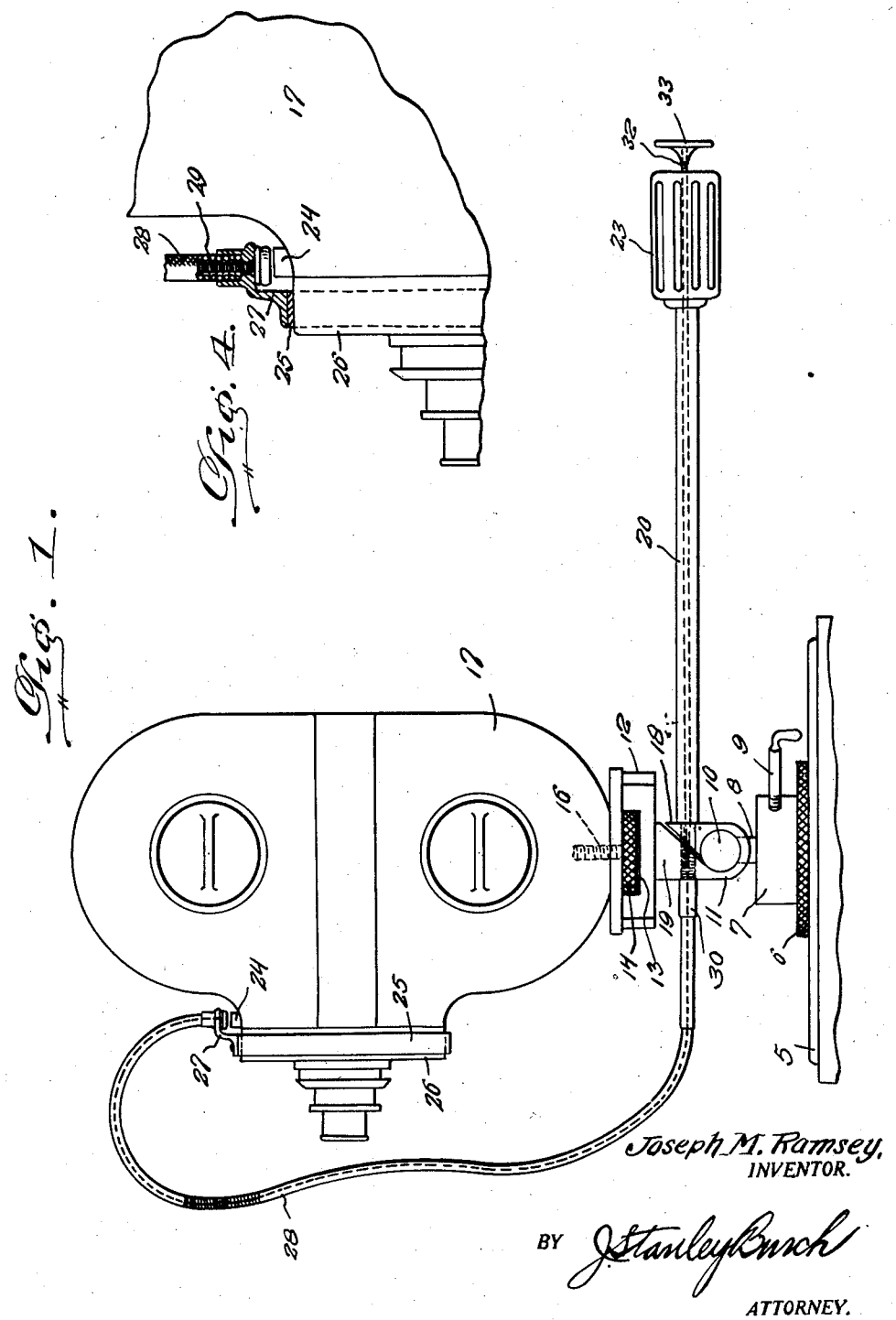
Joseph M. Ramsey,
INVENTOR.
BY J. Stanley Burch
ATTORNEY.

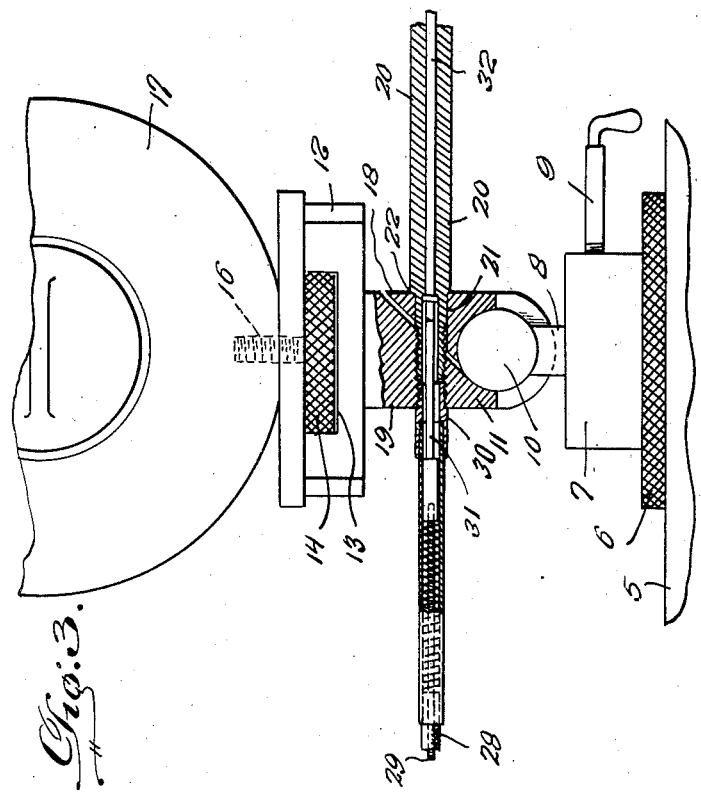
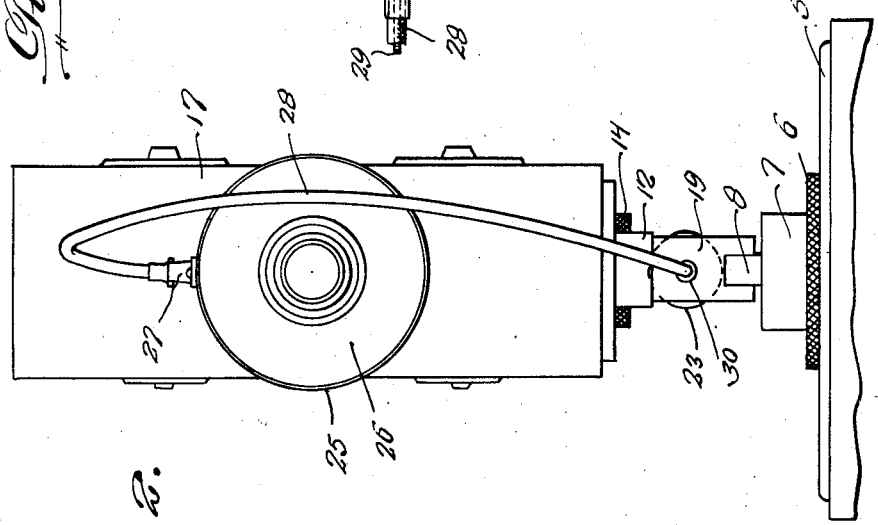

Patented May 12, 1931

1,805,185

UNITED STATES PATENT OFFICE

JOSEPH M. RAMSEY, OF LAKEWOOD, OHIO

COMBINED SUPPORT AND SHUTTER ACTUATING MEANS FOR CAMERAS

Application filed October 14, 1929. Serial No. 399,565.

This invention relates to an attachment for cameras, and has for its primary object the provision of novel means whereby the shutter of the camera may be readily actuated by the same hand used by the operator to direct the camera.

A more particular object is to provide means for enabling the operator of a moving picture camera to readily employ one hand to adjust or direct the camera relative to its support and actuate the shutter of the camera, thereby leaving his other hand free to actuate the moving picture taking mechanism of the camera.

Other objects will appear as the nature of the invention is better understood, and the invention consists in the novel form, combination and arrangement of parts hereinafter described, shown in the accompanying drawings, and claimed.

In the drawings:

Figure 1 is a side elevation of a moving picture camera and support provided with my invention.

Figure 2 is a front elevation thereof.

Figure 3 is an enlarged fragmentary detail view of the same, partly in side elevation, and partly broken away and in section; and Figure 4 is an enlarged fragmentary detail view showing the operative relation of cable release to the shutter actuating button of the camera.

Referring in detail to the drawings, 5 indicates the platform of a tripod provided with a supporting disk 6 having a hollow raised central portion 7 in which is swivelled the lower end of a vertical stem 8 for rotation about its vertical axis. A set screw 9 is provided to releasably hold the stem 8 from turning, and rigid with the upper end of said stem is a cross bar 10 having a split socket member 11 mounted thereon for rocking movement about the horizontal axis of said cross bar 10. Above the cross bar 10, the front end portion of the socket member 11 is thickened and provided with an integral enlarged head 12 formed with a horizontal slot 13 having a hand wheel 14 mounted therein. The hand wheel 14 carries a threaded stud 16 which freely projects through the top of the head 12 and is adapted to be threaded into the bottom of the camera 17 to secure the latter on the tripod. The portion of the socket member 11 above the cross bar 10 has a longitudinal horizontal bore, the wall of which is smooth through the rear free end portion 18 of said socket member and threaded in the thickened front portion 19 of the same. A rod 20 has a reduced end portion 21 which freely extends through the rear smooth bore portion of the socket member 11 and has threaded engagement with the front thread bore portion thereof. When the rod 20 is turned to thread its reduced end into the front portion 19, the shoulder 22 at the inner end of the reduced end portion 21 of said rod abuts the free rear portion 18 and draws it forward into gripping engagement with the cross bar 10, thus locking the camera in any position to which it may be tilted about the horizontal axis of the cross bar 10. By turning the rod 20 in the opposite direction, the rear portion 18 of the socket member 11 is loosened so that the camera may be tiltably adjusted. This adjustment is effected by using the rod 20 as a handle, as is also the case when turning the camera about the vertical axis of the stem 8 when the set screw 9 is loosened, the rear end of rod 20 being provided with a hand grip 23. As thus far described, the construction is conventional and well known in the art; but the operator must thus direct the camera and then reach for and depress the shutter actuating button 24 at the upper front portion of the camera, before beginning or resuming actuation of the picture taking mechanism. Needless to say, this is an awkward operation which is objectionable by reason of the trouble involved and the resultant interruption of the picture taking operation when making changes in the position of the camera.

In order to overcome the above objections, I provide means to enable the operator to effect depression of the shutter actuating button 24 by means of the same hand used to operate the handle or rod 20 by grasping the hand grip 23 thereof. In carrying out the invention, I secure a band 25 about the front turret 26 of the camera, such band having a bracket 27 at the top which has an apertured end overhanging the shutter release button 24. An ordinary cable release 28 is attached at one end to the bracket 27 so that the adjacent end of its actuating wire 29 is disposed to engage and operate the button 24, as shown in Figures 1 and 4. The other end of the cable release 28 is attached to the front part 19 of the socket member 11 in line with its bore, preferably by providing this end of the cable release with a threaded fitting 30 threaded into the bore of the part 19. At this end, the actuating wire 29 of the cable release 28 has a spring-pressed plunger rod 31 which projects into the adjacent end of rod 20. The rod 20 is hollow and has a further plunger rod 32 slidable therein with its inner end abutting the plunger rod 31. The outer end portion of the plunger rod 32 projects outwardly of the outer end of the hand grip 23 and has a thumb-piece 33 on the end thereof. The wire 29 is normally yieldingly retracted in the ordinary way familiar with cable releases of cameras, and as the rod 32 abuts the rod 31, it is also normally retracted. Obviously, when the operator grasps the hand grip 23, he may use the thumb of the same hand to press the rod 32 forwardly, thereby projecting the wire 29 and causing it to depress the button 24. Moreover, the button 24 may be held depressed while operating the handle 20, 23 to change the position or direction of the camera, by simply maintaining the pressure of the thumb on the thumb-piece 33.

It will be apparent that the invention may be readily adapted to any of the conventional forms of cameras and camera mounts now in use, the forms thereof shown and described being merely selected by way of illustration to reveal one embodiment of the invention.

What I claim as new is:

1. A device of the class described comprising a support, means for mounting a camera on said support for being adjusted relative thereto, said mounting means including a movable camera supporting member and a handle operable to adjust said camera supporting member and secure it in any position of adjustment, and means carried by said handle and adapted to be operatively connected to the shutter actuating element of the camera for operating the latter.

2. A device of the class described comprising a support, means for mounting a camera on said support for adjustment relative thereto, said mounting means including a movable camera supporting member and a handle operable to adjust said camera supporting member and secure it in various positions of adjustment, and shutter-controlling means carried by said handle and adapted to be operatively associated with the shutter actuating element of the camera.

3. A device of the class described comprising a cable release, means to conduct one end of the cable release to a camera with its actuating wire in position to actuate the shutter actuating element of the camera, means including a movable supporting member for the camera to mount said camera on a tripod for adjustment relative thereto, said supporting member having a bore, means to connect the other end of the cable release to said supporting member in line with its bore, a hollow handle carried by said supporting member for adjusting the same, and a plunger rod slidable in said hollow handle in line with the bore of said supporting member for actuating said cable release.

4. A device of the class described comprising a support, means for mounting a camera on said support for adjustment relative thereto, said mounting means including a handle and a movable camera supporting member adjustable thereby, a cable release having means to operatively associate the same with the shutter actuating element of the camera and connected to said movable camera supporting member, and means carried by said handle for actuating said cable release.

5. A device of the class described comprising a support, means for mounting a camera on said support for adjustment relative thereto, said mounting means including a handle and a movable camera supporting member adjustable thereby, cable release having means to operatively associate the same with the shutter actuating element of the camera and connected to said movable camera supporting member, and means carried by said handle for actuating said cable release, said handle being hollow, and said cable release actuating means embodying a plunger rod slidable in said handle.

6. A device of the class described comprising, a support, means for mounting a camera on said support for adjustment relative thereto, said mounting means including a handle and a movable camera supporting member adjustable thereby, a cable release having means to operatively associate the same with the shutter actuating element of the camera and connected to said movable camera supporting member, and means carried by said handle for actuating said cable release, said handle embodying a hollow rod having a hand grip at one end, and said cable release actuating means embodying a plunger rod slidable in said hollow rod and having an end projecting outwardly of said hand grip and provided with a thumb piece adjacent the outer end of the latter.

In testimony whereof I affix my signature.

JOSEPH M. RAMSEY.